Sept. 1, 1942.  A. FEUCHT  2,294,541

ROCK DRILL SUPPORT

Filed Nov. 13, 1941

INVENTOR
ALBERT FEUCHT
BY
ATTORNEY

Patented Sept. 1, 1942

2,294,541

UNITED STATES PATENT OFFICE 2,294,541

ROCK DRILL SUPPORT

Albert Feucht, Garfield Heights, Ohio, assignor to The Cleveland Rock Drill Company, Cleveland, Ohio, a corporation of Ohio Application November 13, 1941, Serial No. 418,899

5 Claims. (Cl. 287—96)

This invention relates to improvements in supporting and adjusting devices for power tools, and has reference more particularly to means for supporting and adjusting a feed bar for an air drill used in mining operations.

One of the objects of the invention is the provision of a device of this character wherein the feed bar may be clamped firmly against movement in all directions, but may be adjusted around at least two different axes after a single clamping means has been loosened, whereby with a single positioning of the support for the device in question the feed bar may be swung through a horizontal arc and a vertical arc as well and secured in any selected position of adjustment.

Other objects and features of novelty will appear as I proceed with the description of that embodiment of the invention which, for the purposes of the present application, I have illustrated in the accompanying drawing, in which Fig. 1 is an elevational view of a mounting and adjusting device applied to a rock drill and embodying the invention;

Figure 1:
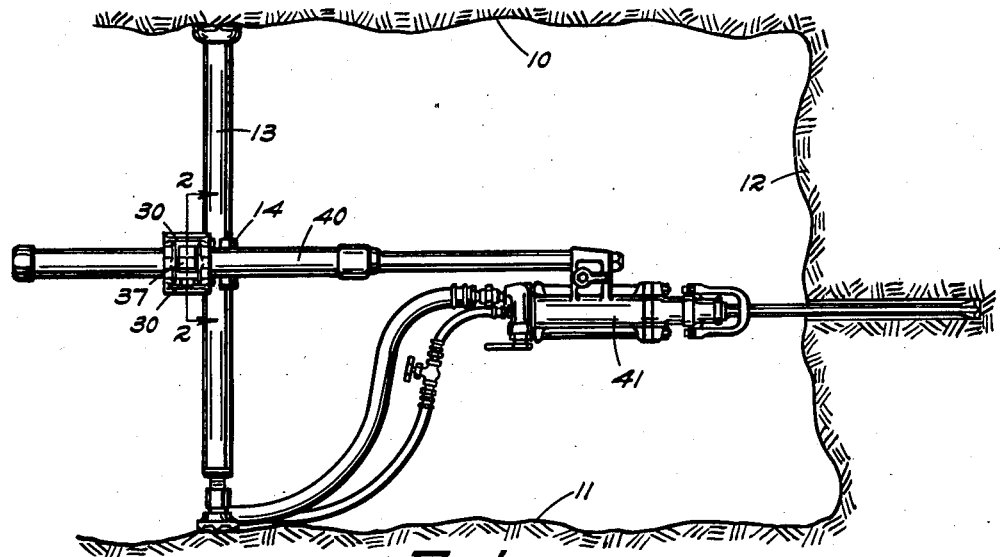
Figure 2:
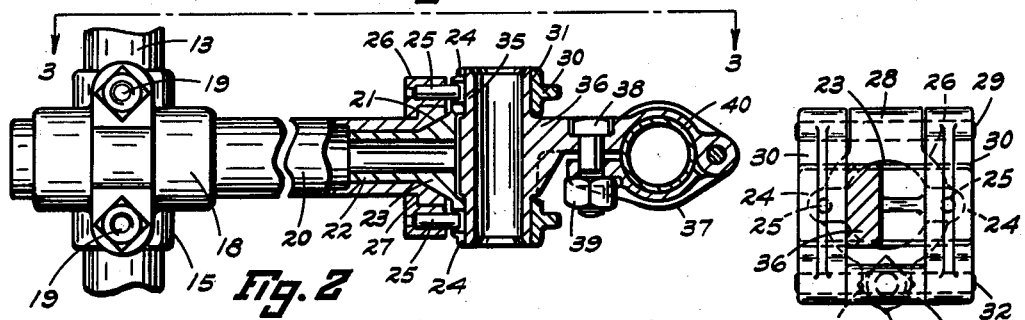
Fig. 2 is a fragmental elevational view taken partly in section upon the line 2—2 of Fig. 1.

In Fig. 1 the ceiling and floor of a mine are indicated at 10 and 11, respectively, and a side wall thereof at 12. A supporting column 13 is set up at a convenient distance from wall 12, being expanded longitudinally by suitable screw means to secure it in position between the ceiling and floor in a manner well-known in the art.

A clamp comprising two elements 14 and 15 with approximately semi-cylindrical clamping surfaces is caused to grip the column 13 at a selected height, that is by means of clamping bolts 16. The clamping element 15 has integral therewith a horizontal portion 17 with a partially cylindrical clamping surface which cooperates with a further clamping element 18 having a clamping surface complementary to that of said portion 17. These latter clamping parts are held together by clamping bolts 19.

Between the clamping jaws 17 and 18 there is fixedly mounted a tubular arm 20. This arm at its free end has a circular socket 21 which in the illustrated case is of conical contour. A hollow shaft 22 is mounted within the arm 20, being capable of rotation therein as well as of longitudinal movement. Near its outer end it has a shoulder 23 which in the illustrated case is conical to correspond with the conical surface of the socket 21. At the extreme end of shaft 22 and extending laterally from the shoulder portion 23 there are two partially cylindrical clamping surfaces which together constitute a clamping element 24. This element has two diametrically opposite openings or recesses to receive pins 25 that are carried by a collar 26. This collar is rotatable upon arm 20, but is prevented from moving longitudinally outward on the arm by cooperating abutting surfaces 27. The pins 25 constitute means for preventing relative rotation between the collar 26 and the shaft 22, but permit the separation of these parts by a relative movement longitudinally so that the shaft may be taken out of the arm when desired.

The collar 26 at one side has an extension 28 in which is mounted a hinge pin 29. On the two projecting ends of this pin are mounted two curved arms 30, preferably ribbed for strength and provided intermediate their ends with partially cylindrical clamping surfaces 31 illustrated herein as of cylindrical contour.

At their free ends the arms 30 carry a pin 32 similar to pin 29 which extends through the hollow head of a T-bolt 33, the shaft of which projects loosely through an opening in a small extension 34 on the collar 26 opposite the extension 28 thereon.

The work support consists of a hollow cylindrical element 35 which is adapted to be gripped between the curved surfaces of the clamping elements 24 and 30, and bears a lateral extension 36 which projects outwardly through the space between the arms 30. An arm 37 is pivotally connected to the extension 36 at the outer end of the latter and may be drawn into clamping position by means of a bolt and nut 38 and 39 for securely holding a cylindrical object such as the feed bar 40 shown in the drawing.

Figures 3, 4:
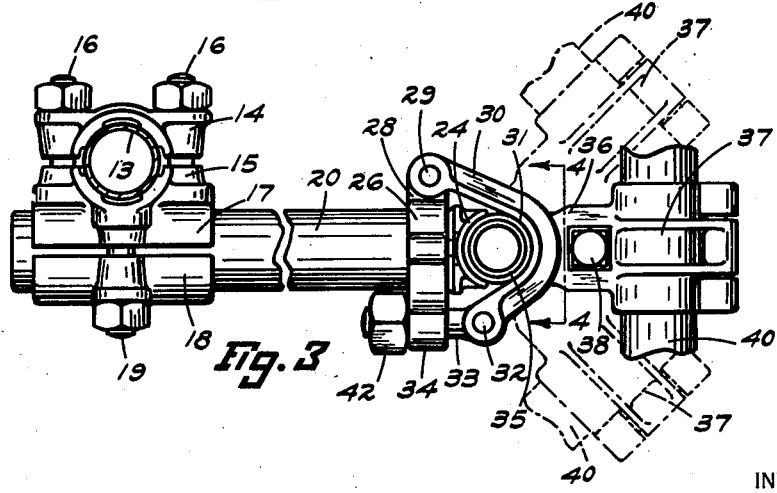
Fig. 3 is a plan view looking in the direction of the arrows 3—3 of Fig. 2.
Fig. 4 is a detail view, partly in section on the line 4—4 of Fig. 3.

Assuming that the feed bar of a rock drill 41 is tightly gripped by the extension 36 and arm 37, and that the arm 20 is fixedly mounted upon the column 13 by a suitable means such as that hereinbefore described, then the cylindrical work support 35 may be swung horizontally through a considerable angle as indicated by dotted lines in Fig. 3, or it may be swung through a vertical angle by oscillating the hollow shaft 22 within the tubular arm 20, the collar 26 moving around the sleeve through the same angle as the shaft because of the connection of pins 25. When the desired drill position is reached a nut 42 on the end of T-bolt 33 is drawn up tightly, thereby pulling the cylindrical clamping surfaces 24, 31 toward each other to grip between them the cylindrical body 35 of the work support, holding it against horizontal movement. At the same time, of course, and in fact as a prerequisite to the tight closing of clamp 24, 31, the shoulder 23 must be forced against the socket 21 thereby holding the hollow shaft against rotation and clamping the feed bar against movement in the vertical plane.

While in certain aspects of the invention it is advantageous to employ the two separated arms 30 as one element of the work holding clamp and to use partially cylindrical clamping surfaces with a work support extension projecting through the space between the arms, in other aspects of the invention these separated clamping arms and cylindrical surfaces are not essential, a work holder that is circular in cross-section with clamping surfaces of correspondingly circular contour being sufficient.

Having thus described my invention, what I claim is:

1. In a supporting and adjusting device for power tools, a fixed rubber tubular arm with a circular end socket, a shaft mounted in said arm having a complementary circular shoulder co-operating with said circular socket, a collar surrounding the arm, abutting means on the collar and arm to prevent movement of the collar longitudinally in one direction, means for holding the collar and the shaft against relative rotation, and a clamp comprising a pair of clamping elements one carried by said shaft and one carried by said collar, whereby pressure applied to tighten said clamp exerts pressure to force said circular shoulder against said circular socket.

2. In a supporting device for power tools, a fixed tubular arm with a tapered end socket, a shaft mounted in said arm having a tapered shoulder cooperating with said tapered socket, a collar surrounding the arm, abutting means on the collar and arm to prevent movement of the collar longitudinally in one direction, means for holding the collar and the shaft against relative rotation, and a clamp comprising a pair of clamping elements one carried by said shaft and one carried by said collar, whereby pressure applied to tighten said clamp exerts pressure to force said tapered shoulder against said tapered socket.

3. In a supporting and adjusting device for power tools, a fixed tubular arm with a circular end socket, a shaft mounted in said arm having a complementary circular shoulder cooperating with said circular socket, a collar surrounding the arm, abutting means on the collar and arm to prevent movement of the collar longitudinally in one direction, means for holding the collar and the shaft against relative rotation, a clamp comprising a clamping element on said shaft beyond said circular shoulder, said element having a partially circular clamping surface, and said clamp comprising a further clamping element carried by said collar, said latter clamping element having a partially circular clamping surface, and a work support having a circular surface adapted to be gripped by the partially circular surfaces of said clamping elements, whereby pressure applied to tighten said clamp exerts pressure to force said circular shoulder against said circular socket.

4. In a supporting and adjusting device for power tools, a fixed tubular arm with a circular end socket, a shaft mounted in said arm having a complementary circular shoulder cooperating with said circular socket, a collar surrounding the arm, abutting means on the collar and sleeve to prevent movement of the collar longitudinally in one direction, means for holding the collar and shaft against relative rotation, a clamp comprising a clamping element on said shaft beyond said circular shoulder, said element having a partially cylindrical clamping surface and said clamp comprising a further clamping element consisting of two separated arms provided with partially cylindrical clamping surfaces, a work support having a cylindrical surface adapted to be gripped by the partially cylindrical surfaces of the clamping elements, and having a lateral extension projecting through the space between said separated arms.

5. In a supporting and adjusting device for power tools, a fixed tubular arm with a circular end socket, a shaft mounted in said arm having a complementary circular shoulder cooperating with said circular socket, a collar surrounding the arm, abutting means on the collar and arm to prevent movement of the collar longitudinally in one direction, means for holding the shaft and collar against relative rotation, said means being separable by relative movement of the shaft and collar longitudinally, and a clamp comprising a pair of clamping elements one carried by said shaft and one carried by said collar, whereby pressure applied to tighten said clamp exerts pressure to force said circular shoulder against said circular socket.

ALBERT FEUCHT.

CERTIFICATE OF CORRECTION.

Patent No. 2,294,541.  September 1, 1942.

ALBERT FEUCHT.

It is hereby certified that error appears in the printed specification of the above numbered patent requiring correction as follows: Page 2, first column, line 23, claim 1, strike out the word "rubber"; and that the said Letters Patent should be read with this correction therein that the same may conform to the record of the case in the Patent Office.

Signed and sealed this 29th day of September, A. D. 1942.

(Seal)

Henry Van Arsdale,
Acting Commissioner of Patents.